(12) United States Patent
Arendsen et al.

(10) Patent No.: US 10,023,127 B2
(45) Date of Patent: Jul. 17, 2018

(54) VEHICLE INTERIOR COMPONENT

(71) Applicant: Shanghai Yanfeng Jinqiao Automotive Trim Systems Co., Ltd., Plymouth, MI (US)

(72) Inventors: Randy L Arendsen, Zeeland, MI (US); Eric Charles Asselin, Holland, MI (US); Michael H Weiss, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/280,760

(22) Filed: Sep. 29, 2016

(65) Prior Publication Data

US 2017/0015251 A1 Jan. 19, 2017

Related U.S. Application Data

(63) Continuation of application No. PCT/US2015/023301, filed on Mar. 30, 2015.

(60) Provisional application No. 61/972,578, filed on Mar. 31, 2014.

(51) Int. Cl.
*B60R 7/04* (2006.01)
*B62D 65/14* (2006.01)

(52) U.S. Cl.
CPC ............... *B60R 7/04* (2013.01); *B62D 65/14* (2013.01); *B60Y 2304/072* (2013.01)

(58) Field of Classification Search
CPC ...... B60R 7/04; B60Y 2304/072; B62D 65/14

USPC ........................................................ 296/37.8
See application file for complete search history.

(56) References Cited

U.S. PATENT DOCUMENTS

| | | | |
|---|---|---|---|
| 4,867,498 A | 9/1989 | Delphia et al. | |
| 5,775,761 A | 7/1998 | Asami et al. | |
| 5,823,612 A | 10/1998 | Angelo | |
| 6,062,623 A * | 5/2000 | Lemmen | B60R 7/04 224/282 |
| 6,116,675 A * | 9/2000 | Iwasawa | B60N 3/12 224/309 |
| 2005/0134073 A1 | 6/2005 | Tokutomi et al. | |
| 2008/0290681 A1 | 11/2008 | Takai | |

OTHER PUBLICATIONS

International Preliminary Report on Patentability for International Application No. PCT/US15/23301 dated Apr. 13, 2016.
International Search Report for international Application No. PCT/US15/23301 dated Jun. 25, 2015.
(Continued)

*Primary Examiner* — Joseph Pape
*Assistant Examiner* — Dana D Ivey
(74) *Attorney, Agent, or Firm* — Christopher G. Darrow; Darrow Mustafa PC

(57) ABSTRACT

A vehicle interior component is disclosed. The vehicle interior component is an overhead console assembly for a vehicle interior. The overhead console may comprise a bezel/base and a storage member coupled to the bezel. The storage member is configured to move between a retracted/closed position and an extended/open position. The bezel provides a resilient member to aid/facilitate installation/attachment of the storage member to the bezel.

20 Claims, 5 Drawing Sheets

(56) References Cited

OTHER PUBLICATIONS

Written Opinion of the International Searching Authority for International Application No. PCT/US15/23301 dated Jun. 25, 2015.
First Office Action from the European Patent Office for EP Patent Application No. 15 716 941.8 dated Sep. 25, 2017 (in English) (3 pages).
Response to First Office Action from the European Patent Office for EP Patent Application No. 15 716 941.8 filed Feb. 3, 2018 (in English) (8 pages).

* cited by examiner

VEHICLE INTERIOR COMPONENT

CROSS REFERENCE TO RELATED APPLICATIONS

The present application is a continuation of International Application No. PCT/US15023301 titled "CONSOLE ASSEMBLY AND METHOD OF ASSEMBLY AND OPERATION" filed Mar. 30, 2015.

The present application claims priority from and the benefit of and incorporates by reference in entirety of the following applications: (a) International Application No. PCT/US15023301 titled "CONSOLE ASSEMBLY AND METHOD OF ASSEMBLY AND OPERATION" filed Mar. 30, 2015; (b) U.S. Provisional Patent Application No. 61/972,578 titled "CONSOLE ASSEMBLY AND METHOD OF ASSEMBLY AND OPERATION" filed Mar. 31, 2014.

FIELD

The present invention relates to a vehicle interior component. The present invention also relates to a vehicle interior component such as an overhead console.

BACKGROUND

It is known to provide a console for a vehicle interior. It is also known to provide an overhead console for the vehicle interior. It is also known to provide a storage member/compartment within the overhead console. It is also known to provide a door/cover for the storage member/compartment to facilitate access of the storage member/compartment.

It would be advantageous to provide an improved overhead console assembly. It would also be advantageous to provide an improved base of the overhead console assembly to facilitate installation of the storage member to the base of the overhead console assembly.

SUMMARY

The present invention relates to a console assembly configured to stow an article. The console assembly comprises a base, a compartment structure coupled to the base comprising a receptacle into which the article can be stowed and a mechanism configured to couple the compartment structure to the base comprising a first projection configured to be engaged in a first aperture; a second projection configured to be engaged in a second aperture to establish an axis for rotation of the compartment structure between a retracted position and an extended position; and a tab configured to be engaged with the second projection when the second projection is positioned within the second aperture to maintain the second projection within the second aperture. The base may comprise a first structure comprising the first aperture and a second structure comprising the second aperture; the first structure may oppose the second structure to at least partially provide an opening for installation of the compartment structure. The compartment structure may be configured to be positioned between the first structure and the second structure of the base. The tab may be configured to flex in a direction away from the first structure when the compartment structure is assembled to the base; tab at least partially defines the second aperture; tab may be integrally formed with the base. The tab may be configured to substantially align the first projection and the second projection with the first aperture and the second aperture. The tab may be configured to prevent the compartment structure from decoupling from the base. The tab may comprise a flexible structure configured to facilitate assembly of the compartment structure to the base. When the compartment structure is installed to the base the first projection and the second projection and the first aperture and the second aperture align to the axis of rotation of the compartment structure. The first structure may comprise a side wall. The tab may comprise a projection at the second structure.

The present invention also relates to a console assembly configured to stow an article. The console assembly comprises a base comprising a housing, a compartment structure comprising a receptacle into which the article can be stowed, a pivot mechanism configured to couple the compartment structure to the base and comprising a first projection configured to be engaged in a first aperture and a second projection configured to be engaged in a second aperture to establish an axis for rotation of the compartment structure between a closed position and an open position relative to the base and a slot comprising a tab and the second aperture configured to be engaged with the second projection when the second projection is positioned in the second aperture. The pivot mechanism may be configured so that when the compartment structure is being installed in the housing of the base the first projection is engaged in the first aperture and the second projection is engaged in the slot to deflect the tab as the second projection is moved to be positioned in the second aperture. When the compartment structure is installed in the housing of the base the first projection may be engaged in the first aperture and the second projection is positioned and engaged in the second aperture so that the compartment structure is rotatable on the axis of rotation. The tab may comprise a projection within the slot providing an end and the second aperture is provided in the slot at the end of the tab. The second projection may be a pivot pin provided on the compartment structure; wherein the base comprises the slot with the tab for engagement with the pivot pin; the first projection may be a pivot pin provided on the compartment structure; wherein the base comprises the first aperture for the first projection. The end of the tab within the slot may be configured to be deflected when the tab is engaged by the second projection during installation of the compartment structure in the base as the second projection moves along the slot toward the second aperture and the tab is disengaged by the second projection when the second projection engages the second aperture in the slot at the end of the tab. The housing may comprise an opening defined at least partially by a first side wall and an opposed second side wall; the compartment structure may comprise a storage member providing the receptacle into which the article can be stowed; the closed position may comprise a retracted position in which the receptacle is substantially inaccessible and the open position comprises an extended position in which the receptacle is accessible to stow or remove the article. The second projection of the pivot mechanism may comprise a pivot extending from one of the first side wall of the housing and the storage member; wherein the slot may comprise a channel defined in the other of the first side wall of the housing and the storage member into which the pivot is received. The tab may comprise a resilient member positioned adjacent the channel and having a distal end engageable with the pivot when the resilient member is in a biased first position to obstruct removal of the pivot from the channel; the resilient member may be deflectable to a second position to permit movement of the pivot through the channel; the pivot extends from the storage member and the channel is defined by the first side wall of the housing.

The present invention also relates to a method of assembling a console assembly for a vehicle comprising a compartment structure configured to be coupled by a pivot mechanism to a base providing a housing. The method comprises positioning the compartment structure in the housing with a first projection of the pivot mechanism in a first aperture of the pivot mechanism and positioning the compartment structure in the housing with a second projection of the pivot mechanism in a slot comprising a tab and a second aperture so that the second projection deflects the tab to allow movement of the second projection along the slot and movement of the compartment structure relative to the housing and positioning the compartment structure in the housing by movement of the second projection of the pivot mechanism along the slot into the second aperture so that the first projection of the pivot mechanism is engaged in the first aperture and the second projection of the pivot mechanism is engaged in the second aperture and the compartment structure is configured for pivotal movement relative to the base and housing between a closed position and open position. With the second projection in the second aperture the tab in the slot is disengaged and not substantially deflected; the tab at an end is configured to retain the second projection in the second aperture.

FIGURES

DESCRIPTION

Figure 1:
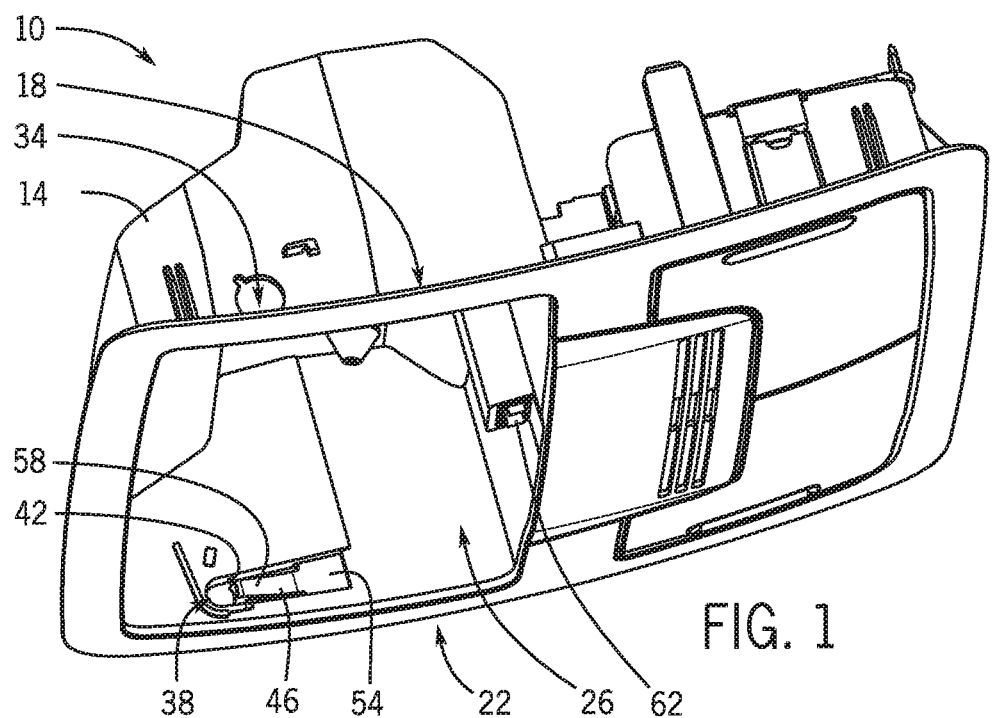
FIG. 1 is a schematic perspective bottom view of an overhead console according to an exemplary embodiment.
Figure 2:
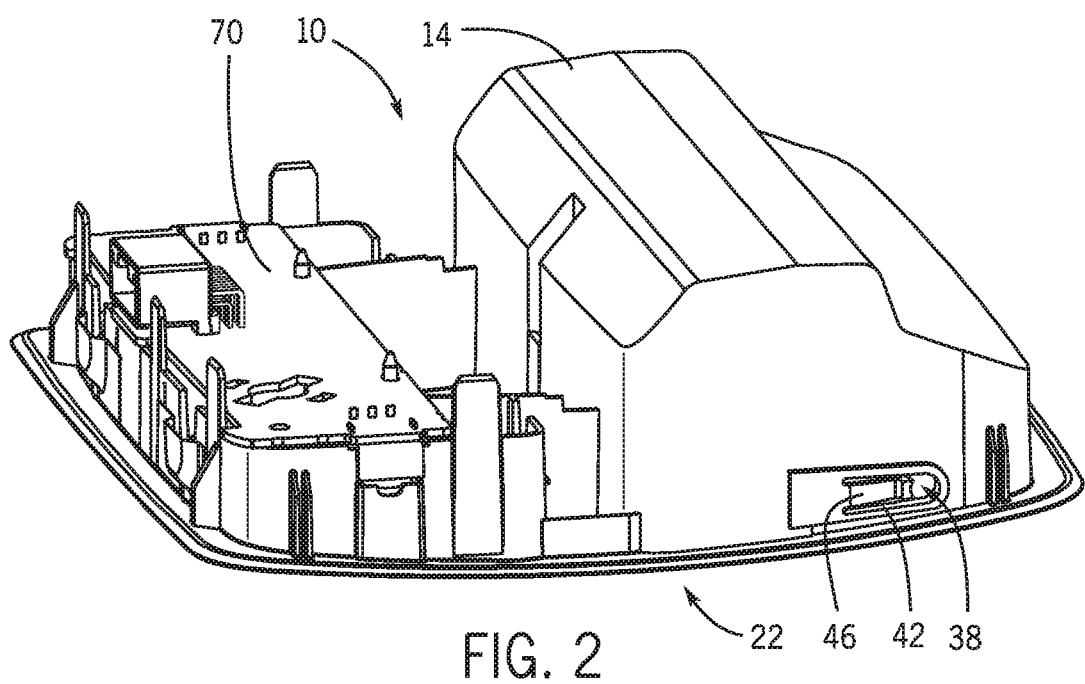
FIG. 2 is a schematic perspective top view of the overhead console according to an exemplary embodiment.

As shown schematically according to an exemplary embodiment in FIGS. 1 and 2, an overhead console assembly 10 comprises a bezel/base 14. Bezel or base 14 provides an opening 26; opening 26 is configured to receive a storage member (e.g. comprising a compartment structure, receptacle, bin, etc. for items and articles) according to an exemplary embodiment. Overhead console assembly 10 provides two opposing holes/apertures (i.e. hole 34 and hole 38) on two opposing structures shown as comprising side walls (i.e. wall 18 and wall 22) respectively.

As shown schematically according to an exemplary embodiment in FIGS. 1 and 2, wall 22 of bezel 14 provides a channel 42; channel 42 is configured to facilitate installation of the storage member according to an exemplary embodiment; channel 42 provides a resilient member 46.

Figure 3:
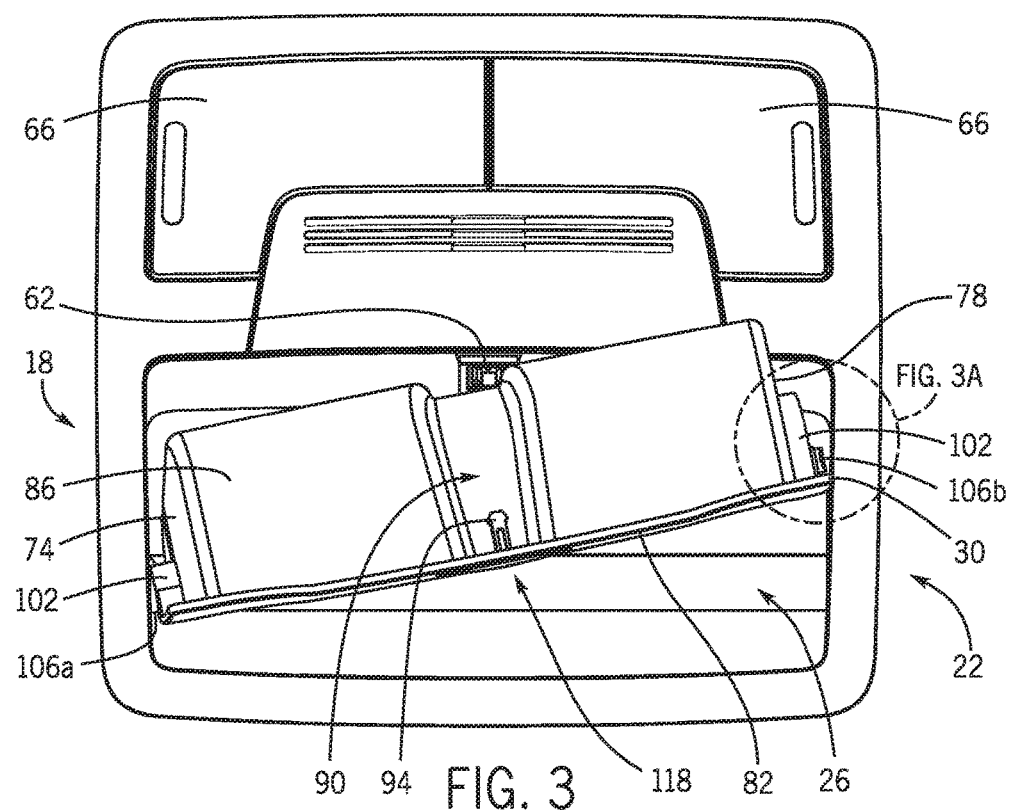
FIG. 3 is a schematic bottom view of a storage member being installed to the overhead console according to an exemplary embodiment.

As shown schematically according to an exemplary embodiment in FIGS. 2 and 3, overhead console assembly 10 may provide a circuit board 70 shown as a printed circuit board 70 and electronic devices such as lights 66; printed circuit board 70 is configured to control electronic devices such as lights 66 according to an exemplary embodiment.

Figure 3A:
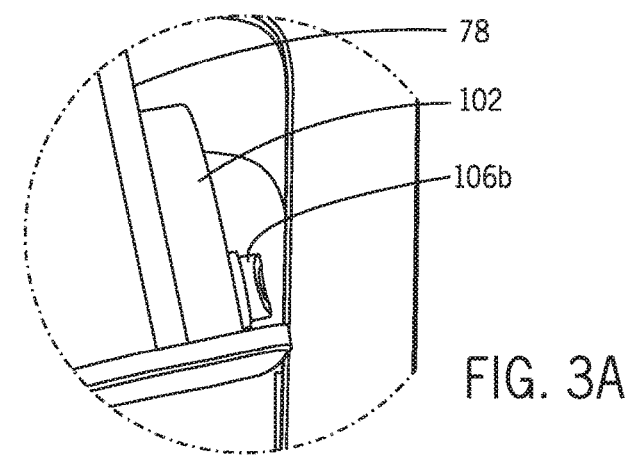
FIG. 3A is a schematic bottom detail view of the interaction between the storage member and the overhead console during installation according to an exemplary embodiment.
Figure 4A:
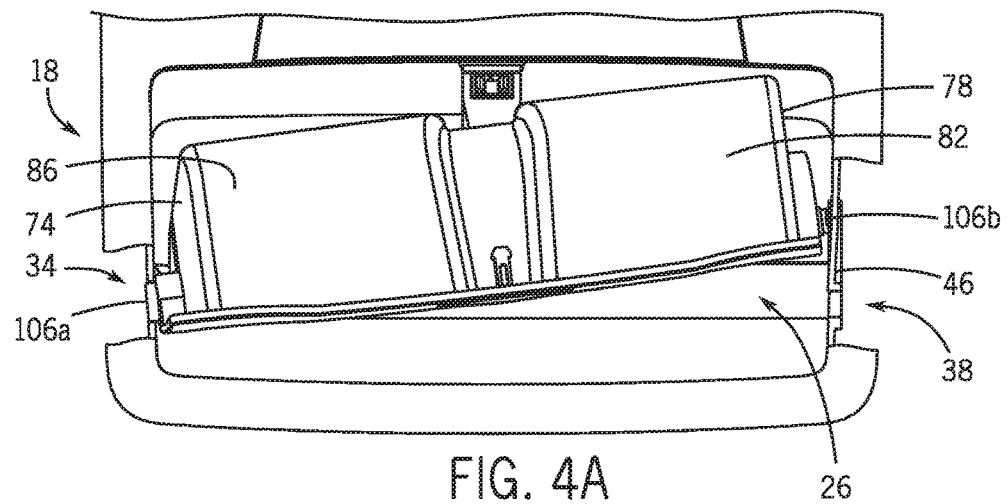
FIGS. 4A to 4C are schematic bottom detail views of the process of installation of the storage member to the overhead console according to an exemplary embodiment.

As shown schematically according to an exemplary embodiment in FIGS. 3, 3A and 4A, a storage member 30 provides two opposing pivots/pins (i.e. a pivot/pin 106a and a pivot/pin 106b); pivot/pin 106a of storage member 30 is inserted into hole/aperture 34 on bezel 14. Resilient member 46 is at a biased position. See FIGS. 1, 2 and 4A.

Figure 4B:
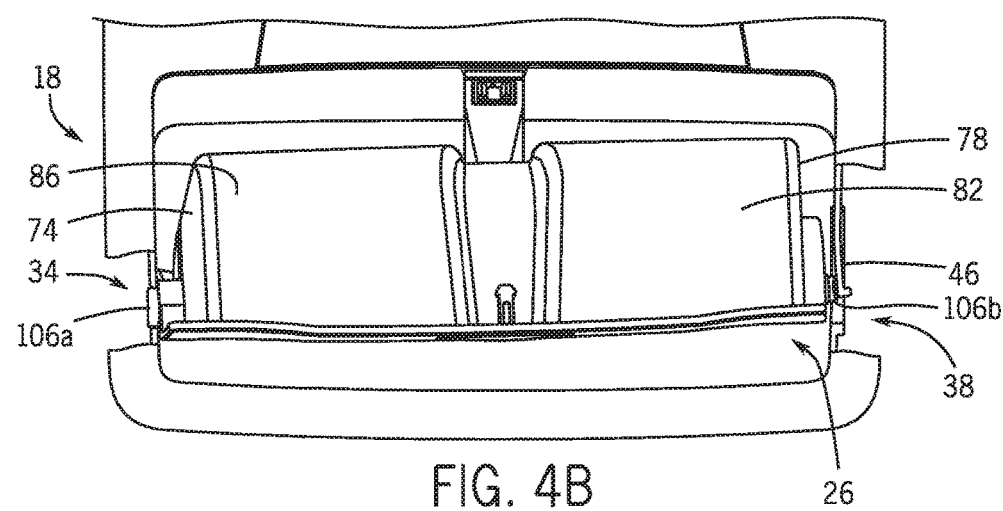

As shown schematically according to an exemplary embodiment in FIG. 4B, pivot/pin 106b slides along resilient member 46 towards hole/aperture 38 on bezel 14. Resilient member 46 is deformed from the biased position to facilitate installation of storage member to bezel 14.

Figure 4C:
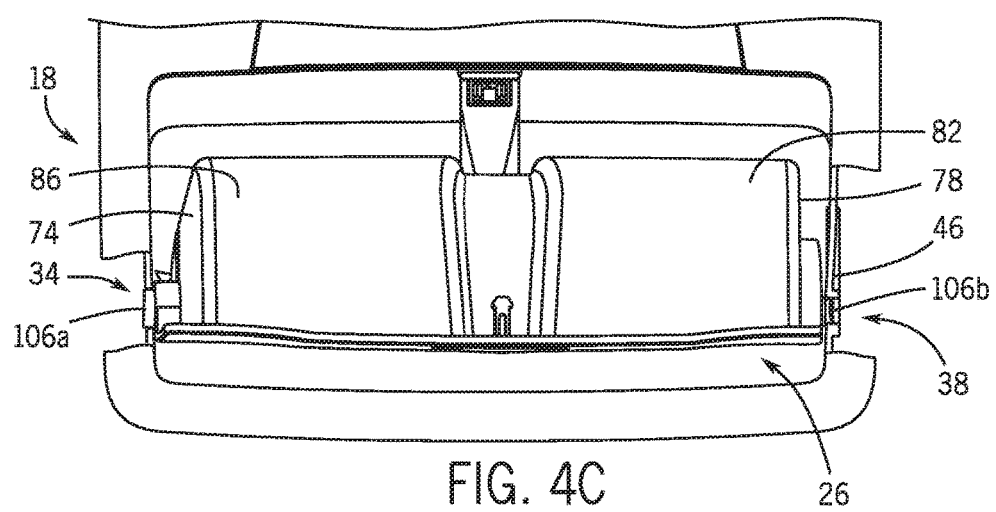
Figure 5:
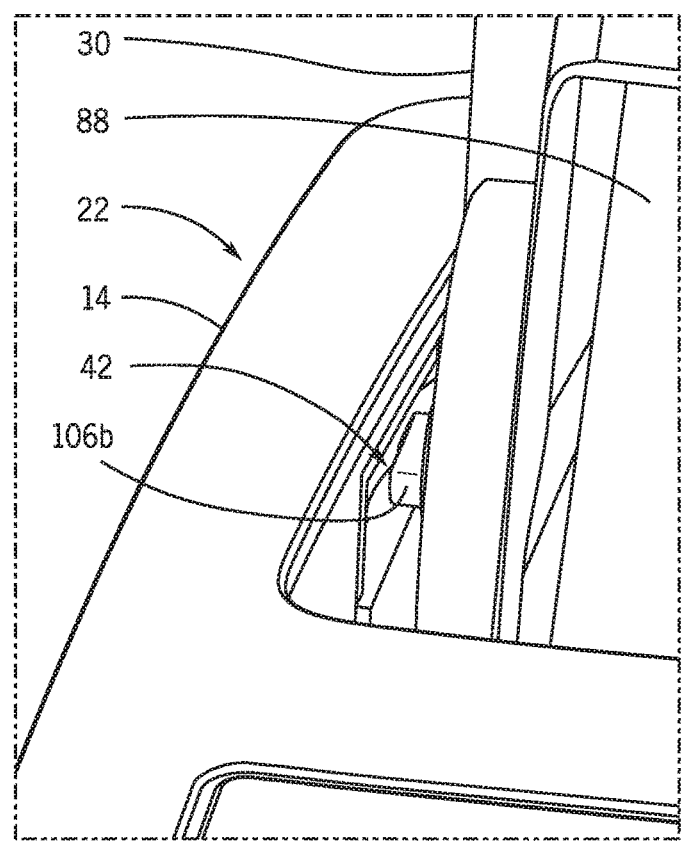
FIG. 5 is a schematic perspective detail view of the interaction between the storage member and the overhead console according to an exemplary embodiment.

As shown schematically according to an exemplary embodiment in FIG. 4C, pivot/pin 106b is inserted into hole/aperture 38; resilient member 46 returns to the biased position. The distal end 58 of resilient member 46 is configured to retain pivot/pin 106b at an attached position (e.g. installed). See also FIGS. 5 and 6. As shown schematically in FIG. 4C, pivot/pin 106a, hole/aperture 34, pivot/pin 106b and hole/aperture 38 are aligned coaxially (e.g. on an axis of rotation) to facilitate movement of storage member 30 between a retracted/closed position and an extended/open position according to an exemplary embodiment.

Figure 6:
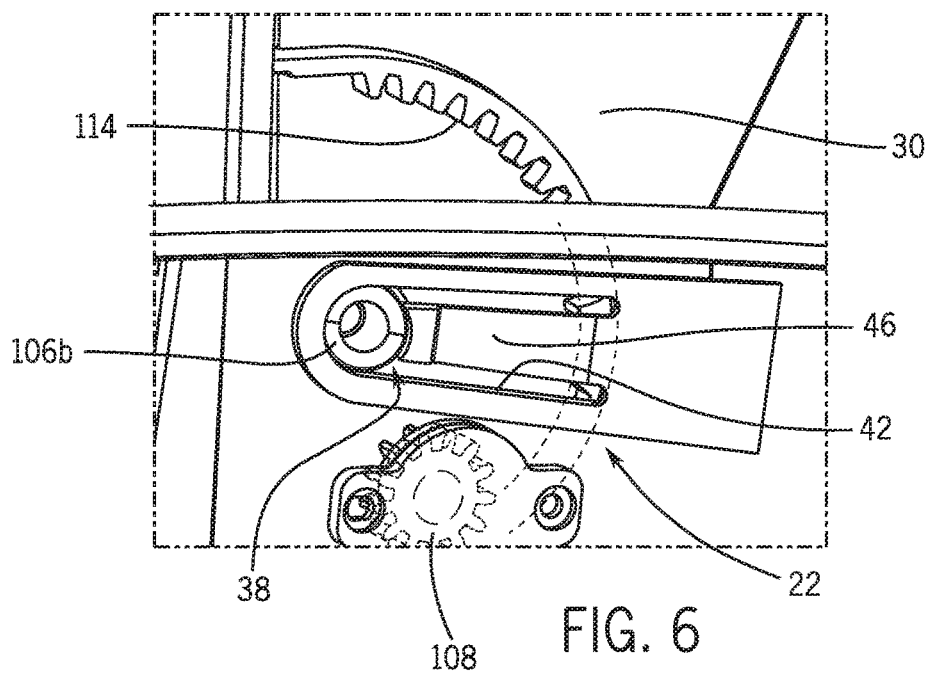
FIG. 6 is a schematic perspective detail view of the interaction between the storage member and the overhead console according to an exemplary embodiment.

As shown schematically according to an exemplary embodiment in FIG. 6, storage member 30 provides a rack 114; overhead console assembly 10 provides a damper 108 shown as rotary damper 108. As shown schematically in FIG. 6, rotary damper 108 is engaged with rack 114; damper 108 is configured to prevent abrupt movement (e.g. to dampen movement) of storage member 30 between opening and closing (e.g. an open/extendable position and a closed/retracted position).

A method of assembling a console assembly for a vehicle is shown according to an exemplary embodiment comprising a compartment structure configured to be coupled by a pivot mechanism to a base providing a housing. The method may comprise the steps of positioning the compartment structure in the housing with a first projection of the pivot mechanism in a first aperture of the pivot mechanism and positioning the compartment structure in the housing with a second projection of the pivot mechanism in a slot comprising a tab and a second aperture so that the second projection deflects the tab to allow movement of the second projection along the slot and movement of the compartment structure relative to the housing and positioning the compartment structure in the housing by movement of the second projection of the pivot mechanism along the slot into the second aperture so that the first projection of the pivot mechanism is engaged in the first aperture and the second projection of the pivot mechanism is engaged in the second aperture and the compartment structure is configured for pivotal movement relative to the base and housing between a closed position and open position. When the second projection may be in the second aperture the tab in the slot is disengaged and not substantially deflected so that the tab at an end is configured to retain the second projection in the second aperture.

The compartment structure may comprise an integrally formed structure including the second projection. The housing may comprise an integrally formed molded structure. The tab may be integrally formed with the housing.

Exemplary Embodiment

As shown schematically in FIGS. 1 to 6, a console assembly 10 is an overhead console assembly 10 suitable for installation in an interior ceiling or headliner of a vehicle. According to an exemplary embodiment, console assembly 10 can be installed near a rearview mirror of the vehicle and centered between the front seats for easy access to console assembly 10 by vehicle occupants. According to an exemplary embodiment, console assembly 10 can be used for various applications and in various orientations and/or locations within a vehicle.

As shown schematically in FIG. 1, console assembly 10 comprises a housing or bezel 14 having a cavity or opening 26. Bezel 14 provides a first side 18 and an opposing second side 22; first side 18 and second side 22 at least partially define opening 26. As shown schematically in FIG. 1, opening 26 extends from first side 18 to second side 22 of bezel 14; opening 26 is shaped to accommodate a retractable storage member 30 (shown in FIG. 3). According to an exemplary embodiment, storage member 30 (e.g. a sunglass bin) may be sized and shaped to store items such as sunglasses; according to an exemplary embodiment, storage member 30 may function as a door for controlling access into an interior of bezel 14 and/or a storage member 30.

As shown schematically in FIG. 1, bezel 14 provides a first pivot aperture 34 on first side 18 of bezel 14 and a second pivot aperture 38 on second side 22 of bezel 14. As shown schematically in FIG. 1, second side 22 of bezel 14 provides a channel 42; a resilient member 46 is located within in channel 42. As shown schematically in FIG. 1, resilient member 46 comprises a proximal portion or base 54 integrally molded with bezel 14 and a distal portion 58; distal portion 58 is cantilevered from proximal portion 54. According to an exemplary embodiment, resilient member 46 is capable of flexing within channel 42. As shown schematically in FIG. 1, a distal end of resilient member 46 at least partially defines second pivot aperture 38. As shown schematically in FIG. 1, bezel 14 also includes a latch 62; latch 62 is configured as a push-push latch 62 that interacts with a corresponding latch member or latch finger 94 (shown in FIG. 3). According to an exemplary embodiment, latch 62 may be configured in various configurations to hold the storage member in a retracted position. According to an exemplary embodiment, the latch may be configured with a cam and cam follower; the latch may be configured to interface with a latch bolt on the storage member.

As shown schematically in FIGS. 1 to 3 according to an exemplary embodiment, bezel 14 may also include mounting locations for supporting one or more task lights, electronic displays, remote control devices (e.g. door openers), and/or other vehicle accessories. As shown schematically in FIGS. 1 and 3, bezel 14 includes two task lights 66 (shown in FIG. 3) connected to a circuit board 70 shown as a printed circuit board 70 (shown in FIG. 2). According to an exemplary embodiment, bezel 14 can be molded as a single piece from ABS, polycarbonate, HDPE, or other suitable rigid or semi-rigid materials.

As shown schematically in FIGS. 3 and 3A, storage member 30 includes a first side wall 74 and a second side wall 78 extending from an outer panel 82 shown as a door 82 and a wall 86 extending between first side wall 74 and second side wall 78. First side wall 74, second side wall 78, outer panel 82 and wall 86 define a receptacle 88 (shown in FIG. 5) having an interior volume; an item or items may be stowed inside of the interior volume of receptacle 88. As shown schematically in FIG. 3, receptacle 88 is sized and shaped to accommodate sunglasses or other types of eyeglasses. Wall 86 is formed with a recess 90 in the middle; recess 90 forms a protrusion inside receptacle 88 to correspond with the nose region of a pair of sunglasses. As shown schematically in FIG. 3, recess 90 provides sufficient space for latch 62 and a corresponding latch member or latch finger 94 located adjacent to or at least partially within recess 90. According to an exemplary embodiment, latch 62 and latch finger 94 can be positioned adjacent to one of side wall 74 and side wall 78; central recess 90 in the middle of wall 86 may be omitted. According to an exemplary embodiment, the receptacle can be sized and shaped for storing various items, such as portable electronic devices, keys, money, tissues, etc. According to an exemplary embodiment, receptacle 88 may be lined with fabric or other soft materials to protect the stowed item(s) from scratches or other damage.

As shown schematically in FIGS. 3 and 3A, storage member 30 provides support portions 102 located at opposing ends of storage member 30 (e.g. on side wall 74 and side wall 78); pivot or pin 106a extends from support portion 102 on side wall 74; pivot or pin 106b extends from support portion 102 on side wall 78 in the opposite direction of pivot or pin 106a. According to an exemplary embodiment, when storage member 30 is assembled to bezel 14, pin 106a is received in aperture 34 on side 18 of bezel 14; pin 106b is received in aperture 38 on side 22 of bezel 14. According to an exemplary embodiment, storage member 30 is able to pivot about pivot or pin 106a and pivot or pin 106b between a retracted position and an extended position.

According to an exemplary embodiment, console assembly 10 may include a biasing member; the biasing member can exert a torque on storage member 30 and biases storage member 30 toward the extended position. According to an exemplary embodiment, the biasing member may take the form of a torsion spring or various other suitable types of biasing members. According to an exemplary embodiment, the biasing member can be omitted; storage member 30 can open under the influence of gravity or user force. As shown schematically in FIG. 6, console assembly 10 provides a rotary damper 108 proximate or adjacent to one or both of the support portions 102; rotary damper 108 is configured to engage with a rack 114 formed on storage member 30 (see FIG. 6). According to an exemplary embodiment, damper 108 resists abrupt deployment of storage member 30 from the retracted/closed position to the extended/open position.

According to an exemplary embodiment, in the retracted/closed position storage member 30 is oriented such that outer panel 82 is aligned with opening 26 in bezel 14 to substantially close opening 26. When storage member 30 is in the retracted/closed position, receptacle 88 is disposed between outer panel 82 and the interior ceiling of the vehicle such that receptacle 88 is generally inaccessible and concealed from view. When storage member 30 is in the retracted/closed position, outer panel 82 provides console assembly 10 with a generally flush appearance and prevents storage member 30 from obstructing the view of vehicle occupants during operation of the vehicle. As shown schematically in FIGS. 1 and 3, storage member 30 is held in the retracted/closed position by way of latch 62 engaging latch finger 94. As shown schematically in FIGS. 1 and 3, according to an exemplary embodiment, latch 62 is a push-push latch 62; according to an exemplary embodiment, other latches may be employed. As shown schematically in FIG. 3, storage member 30 includes a press portion 118. According to an exemplary embodiment, press portion 118 can be manipulated by a vehicle occupant to disengage the latch and permit storage member 30 to pivot towards the extended/open position. In the extended/open position, storage member 30 is oriented such that outer panel 82 is at an angle to opening 26 in bezel 14; receptacle 88 is exposed and is accessible to stow or remove an article or articles. According to an exemplary embodiment, in the extended/open position, press portion 118 can be manipulated by a vehicle occupant to move storage member 30 towards the retracted/closed position and engage the latch to keep storage member 30 at the retracted/closed position.

Referring to FIGS. 3 to 6, the process of installing storage member 30 to bezel 14 is shown.

As shown schematically in FIGS. 3 and 4A, storage member 30 is inserted into the opening 26 at an angle; pivot/pin 106a and pivot/pin 106b do not initially align coaxially with the respective aperture 34 and aperture 38. As shown schematically in FIGS. 3 and 4A, pivot/pin 106a is inserted into aperture 34 while pivot/pin 106b is positioned adjacent to base 54 on side 22. As shown schematically in FIGS. 1, 2, 4A to 4C, storage member 30 is swiveled or swung or slid into position by sliding pivot/pin 106b through channel 42 into aperture 38. As shown schematically in FIG. 4B, resilient member 46 is deflected from a first (undeflected) biased position toward a second position. As shown schematically in FIG. 4C, pivot/pin 106b is received into aperture 38; resilient member 46 returns (i.e. "snaps") back to the first biased position where resilient member 46 blocks channel 42 and prevents pivot/pin 106b from being withdrawn from channel 42. As shown schematically in FIG. 4C, according to an exemplary embodiment, resilient member 46 holds or maintains pivot/pin 106b within aperture 38 coaxially aligning pivot/pin 106a and pivot/pin 106b with aperture 34 and aperture 38 respectively.

According to an exemplary embodiment, in operation storage member 30 may be opened from the retracted/closed position by a vehicle occupant pushing against press portion 118 to disengage latch 62. The biasing member, force from a vehicle occupant and/or gravity cause storage member 30 to rotate about pivot aperture 34 and pivot aperture 38 into the extended/open position. According to an exemplary embodiment, during rotation damper 108 resists abrupt deployment of storage member 30. In the extended/open position, a vehicle occupant can stow or remove one or more items from receptacle 88. According to an exemplary embodiment, in the extended/open position a vehicle occupant may push against press portion 118 to return storage member 30 to the retracted/closed position and engage latch 62 to conceal stowed items or articles.

According to an exemplary embodiment, console assembly 10 allows storage member 30 to be installed to bezel 14 without significant physical effort (e.g. bending or otherwise deflecting bezel 14) and/or risk of scratching, marking or otherwise damaging bezel 14. According to an exemplary embodiment, console assembly 10 eliminates additional manufacturing steps or components that are otherwise necessary in other console assemblies (e.g. console assembly 200 and console assembly 300 shown in FIGS. 7 and 8) and increases the speed at which console assembly 10 can be assembled in comparison with console assembly 200 and console assembly 300.

Figure 7:
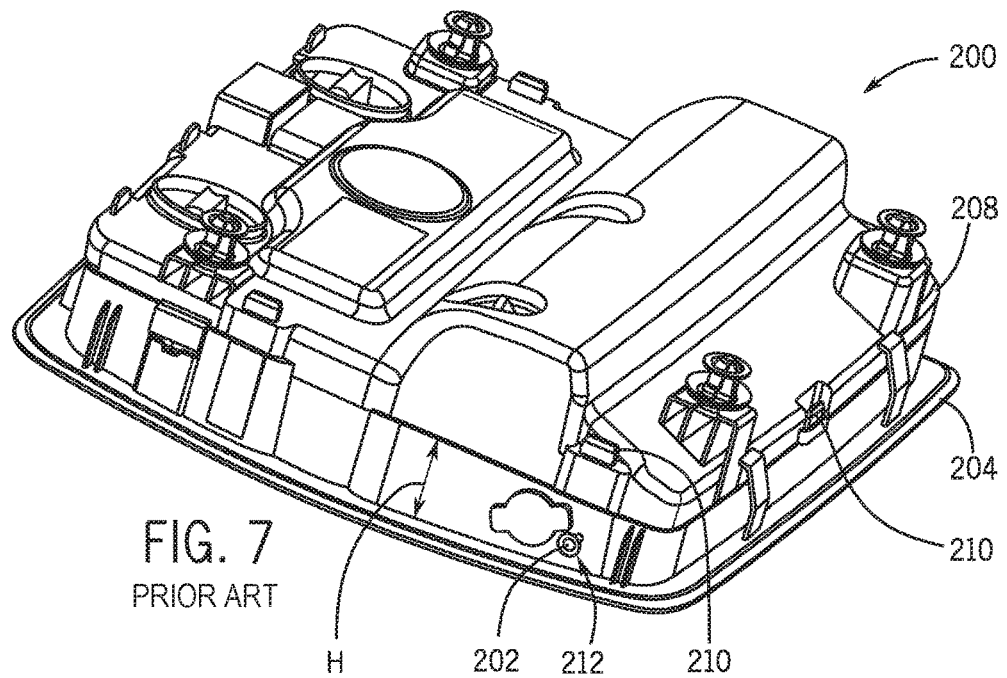
FIG. 7 is a schematic perspective view of an overhead console according to an exemplary embodiment.

As shown schematically in FIG. 7, console assembly 200 comprises housing or bezel 204 and a bin cover 208 coupled to bezel 204. According to an exemplary embodiment, bin cover 208 is a separate part prepared/pre-formed prior to joining/coupling/attaching to bezel 204. According to an exemplary embodiment, console assembly 200 may comprise a pivoting storage member (e.g. a sunglasses bin, etc.). As shown schematically in FIG. 7, bezel 204 provides two opposing apertures 212 positioned on opposite side walls of bezel 204; two corresponding pivot pins 202 of the storage member are received in the two opposing apertures 212. As shown schematically in FIG. 7, bezel 204 is generally annular with a relatively short wall height H; bezel 204 is capable of being deformed during the process of assembling the storage member to bezel 204. According to an exemplary embodiment, assembling the storage member to bezel 204 occurs prior to attachment of bin cover 208 to bezel 204. According to an exemplary embodiment, after insertion of the first pivots/pins 202 into a corresponding aperture 212 in one of the side walls of bezel 204, bezel 204 is deformed or flexed to create sufficient space between the side walls of bezel 204 to insert the second pivots/pins 202 into a corresponding aperture 212 in the opposing/other side wall of bezel 204. After the storage member is installed bin cover 208 is attached to bezel 204 to increase the overall structural rigidity of console assembly 200. As shown schematically in FIG. 7, heat stakes 210 are used to secure bin cover 208 onto bezel 204.

Figure 8:
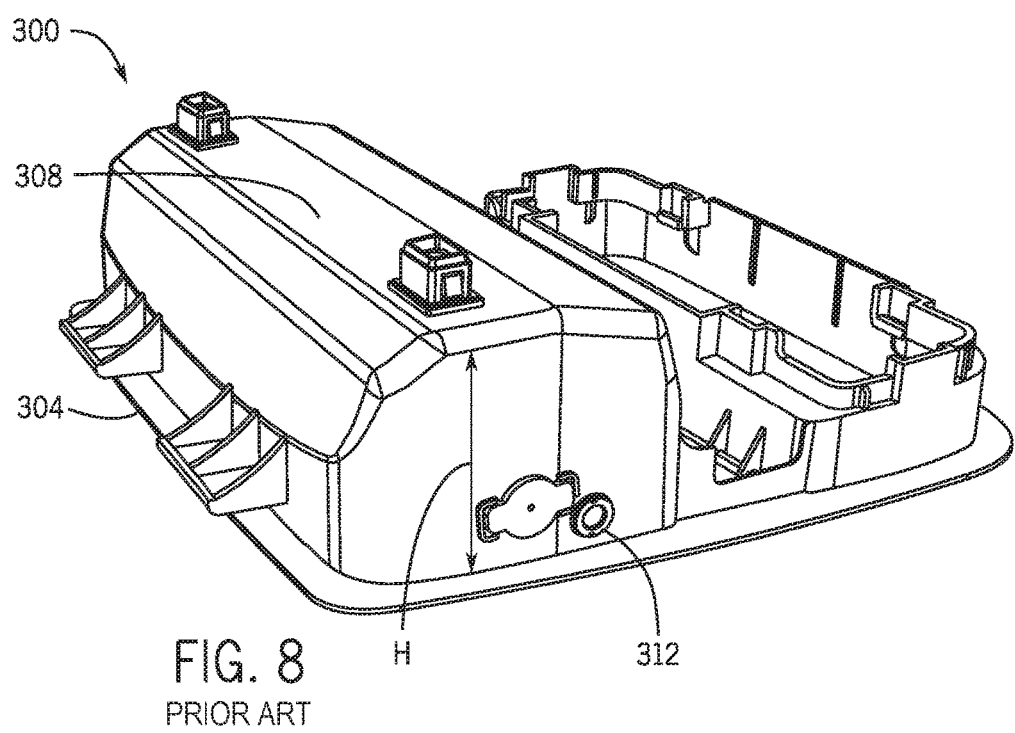
FIG. 8 is a schematic perspective view of an overhead console according to an exemplary embodiment.

As shown schematically in FIG. 8, console assembly 300 comprises a bezel portion 304 integrally molded with a bin cover portion 308 as one piece. As shown schematically in FIG. 8, the effective side wall height H is relatively tall to make the bezel portion 304 rigid; according to an exemplary embodiment, the relatively tall side wall may inhibit bezel portion 304 from deforming adequately to install a storage member (e.g. a sunglasses bin) without the storage member scratching or otherwise damaging bezel portion 304. The storage member is formed having one pivot pin formed on one side. During installation the single pivot pin is placed into a corresponding pivot aperture in bezel portion 304. As shown schematically in FIG. 8, the side of the storage member without a pivot pin is secured to the opposite side of bezel portion 304 using a pivot bushing 312, screw or any other suitable fastener. According to an exemplary embodiment, a storage member including two pivot pins may be used; bezel portion 304 may be heated to temporarily lower its rigidity and provide sufficient space for snapping the storage member into place. According to an exemplary embodiment, console assembly 200 and console assembly 300 shown in FIGS. 7 and 8 require either additional manufacturing steps (i.e. forming the heat stakes 210 shown in FIG. 7) or additional components (i.e. the pivot bushing 312 shown in FIG. 8) during assembly.

* * *

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console assembly configured to stow an article comprising:
(a) a base;
(b) a compartment structure coupled to the base comprising a receptacle into which the article can be stowed;
(c) a mechanism configured to couple the compartment structure to the base comprising (1) a first projection configured to be engaged in a first aperture; (2) a second projection configured to be engaged in a second aperture to establish an axis for rotation of the compartment structure between a retracted position and an extended position; and (3) a tab providing an end and configured to be engaged with the second projection when the second projection is positioned within the second aperture to maintain the second projection within the second aperture; and
(d) a slot configured to provide the second aperture at the end of the tab.

2. The console assembly of claim 1 wherein the base comprises a first structure comprising the first aperture and a second structure comprising the second aperture; wherein the first structure opposes the second structure to at least partially provide an opening for installation of the compartment structure.

3. The console assembly of claim 1 wherein the compartment structure is configured to be positioned between the first structure and the second structure of the base.

4. The console assembly of claim 1 wherein the tab is configured to flex in a direction away from the first structure when the compartment structure is assembled to the base.

5. The console assembly of claim 1 wherein the tab at least partially defines the second aperture.

6. The console assembly of claim 1 wherein the tab is integrally formed with the base.

7. The console assembly of claim 1 wherein the tab is configured to substantially align the first projection and the second projection with the first aperture and the second aperture.

8. The console assembly of claim 1 wherein the tab is configured to prevent the compartment structure from decoupling from the base.

9. The console assembly of claim 1 wherein the tab comprises a flexible structure configured to facilitate assembly of the compartment structure to the base.

10. The console assembly of claim 1 wherein when the compartment structure is installed to the base the first projection and the second projection and the first aperture and the second aperture align to the axis of rotation of the compartment structure.

11. The console assembly of claim 2 wherein the first structure comprises a side wall.

12. The console assembly of claim 2 wherein the tab comprises a projection at the second structure.

13. A console assembly configured to stow an article comprising:
(a) a base comprising a housing;
(b) a compartment structure comprising a receptacle into which the article can be stowed;
(c) a pivot mechanism configured to couple the compartment structure to the base and comprising a first projection configured to be engaged in a first aperture and a second projection configured to be engaged in a second aperture to establish an axis for rotation of the compartment structure between a closed position and an open position relative to the base; and
(d) a slot comprising a tab and the second aperture configured to be engaged with the second projection when the second projection is positioned in the second aperture;
wherein the pivot mechanism is configured so that when the compartment structure is being installed in the housing of the base the first projection is engaged in the first aperture and the second projection is engaged in the slot to deflect the tab as the second projection is moved to be positioned in the second aperture;
wherein when the compartment structure is installed in the housing of the base the first projection is engaged in the first aperture and the second projection is positioned and engaged in the second aperture so that the compartment structure is rotatable on the axis of rotation.

14. The console assembly of claim 13 wherein the tab comprises a projection within the slot providing an end and the second aperture is provided in the slot at the end of the tab.

15. The console assembly of claim 13 wherein the second projection is a pivot pin provided on the compartment structure; wherein the base comprises the slot with the tab for engagement with the pivot pin.

16. The console assembly of claim 13 wherein the first projection is a pivot pin provided on the compartment structure; wherein the base comprises the first aperture for the first projection.

17. The console assembly of claim 14 wherein the end of the tab within the slot is configured to be deflected when the tab is engaged by the second projection during installation of the compartment structure in the base as the second projection moves along the slot toward the second aperture and the tab is disengaged by the second projection when the second projection engages the second aperture in the slot at the end of the tab.

18. The console assembly of claim 13 wherein the housing comprises an opening defined at least partially by a first side wall and an opposed second side wall; wherein the compartment structure comprises a storage member providing the receptacle into which the article can be stowed; wherein the closed position comprises a retracted position in which the receptacle is substantially inaccessible and the open position comprises an extended position in which the receptacle is accessible to stow or remove the article; wherein the second projection of the pivot mechanism comprises a pivot extending from one of the first side wall of the housing and the storage member; wherein the slot comprises a channel defined in the other of the first side wall of the housing and the storage member into which the pivot is received; and
wherein the tab comprises a resilient member positioned adjacent the channel and having a distal end engageable with the pivot when the resilient member is in a biased first position to obstruct removal of the pivot from the channel; wherein the resilient member is deflectable to a second position to permit movement of the pivot through the channel; wherein the pivot extends from the storage member and the channel is defined by the first side wall of the housing.

19. A method of assembling a console assembly for a vehicle comprising a compartment structure configured to be coupled by a pivot mechanism to a base providing a housing comprising the steps of:
   (a) positioning the compartment structure in the housing with a first projection of the pivot mechanism in a first aperture of the pivot mechanism;
   (b) positioning the compartment structure in the housing with a second projection of the pivot mechanism in a slot comprising a tab and a second aperture so that the second projection deflects the tab to allow movement of the second projection along the slot and movement of the compartment structure relative to the housing; and
   (c) positioning the compartment structure in the housing by movement of the second projection of the pivot mechanism along the slot into the second aperture so that the first projection of the pivot mechanism is engaged in the first aperture and the second projection of the pivot mechanism is engaged in the second aperture and the compartment structure is configured for pivotal movement relative to the base and housing between a closed position and open position.

20. The method of claim 19 wherein when the second projection is in the second aperture the tab in the slot is disengaged and not substantially deflected so that the tab at an end is configured to retain the second projection in the second aperture.

\* \* \* \* \*